United States Patent [19]

Paulsen

[11] Patent Number: 5,378,077
[45] Date of Patent: Jan. 3, 1995

[54] SHAPED CONNECTING PIECE FOR CONNECTING STRUCTURAL PROFILE MEMBERS

[75] Inventor: Hans-Dieter Paulsen, Zwingenberg, Germany

[73] Assignee: Masco Industries, Inc., Taylor, Mich.

[21] Appl. No.: 859,452

[22] PCT Filed: Nov. 24, 1990

[86] PCT No.: PCT/DE90/00901

§ 371 Date: May 26, 1992

§ 102(e) Date: May 26, 1992

[87] PCT Pub. No.: WO91/08367

PCT Pub. Date: Jun. 13, 1991

[30] Foreign Application Priority Data

| Nov. 24, 1989 | [DE] | Germany | 3938996 |
| Jan. 16, 1990 | [DE] | Germany | 4000983 |
| Apr. 21, 1990 | [DE] | Germany | 4012808 |

[51] Int. Cl.⁶ .............................................. F16B 12/02
[52] U.S. Cl. .................................. 403/402; 403/403; 403/282; 403/205
[58] Field of Search ............... 403/403, 401, 402, 205, 403/282, 292, 298, 294, 365, 367, 372, 382; 160/381

[56] References Cited

U.S. PATENT DOCUMENTS

| 2,101,349 | 12/1937 | Sharp . | |
| 2,989,788 | 6/1961 | Kessler | 403/401 X |
| 3,163,264 | 12/1964 | Gondry . | |
| 3,726,551 | 4/1973 | Levenberg | 287/54 A |
| 4,070,119 | 1/1978 | Duer | 403/292 X |
| 4,105,348 | 8/1978 | Anderson et al. | 403/172 |
| 4,105,352 | 8/1978 | Holdiman | 160/381 X |
| 4,145,150 | 3/1979 | Rafeld | 403/402 X |
| 4,822,205 | 4/1989 | Berdan | 403/403 X |
| 5,040,456 | 8/1991 | Hayes | 403/402 X |

FOREIGN PATENT DOCUMENTS

| 328591 | 3/1976 | Austria . |
| 570357 | 10/1958 | Belgium . |
| 81850 | 10/1963 | France . |
| 1809159 | 6/1970 | Germany . |
| 2307595 | 8/1974 | Germany . |
| 2520916 | 11/1976 | Germany . |
| 2656937 | 6/1977 | Germany . |
| 8805810 | 8/1988 | Germany . |
| 328345 | 4/1958 | Switzerland . |

Primary Examiner—Randolph A. Reese
Assistant Examiner—George D. Spisich
Attorney, Agent, or Firm—Wenderoth, Lind & Ponack

[57] ABSTRACT

A shaped connecting member or piece for connecting structural profile members, in particular door or window casement sections, includes at least one attachment leg that can be inserted into an attachment chamber of the structural profile member and fixed in position therein. To make fabrication of the shaped connecting piece and its application as simple as possible, at least one resilient element is provided in the at least one attachment leg to project beyond a side surface thereof. When the attachment leg is inserted into the attachment chamber, at least an outer segment of the resilient element gives way elastically inwardly and blocks the attachment leg from being pulled outwardly from the attachment chamber.

37 Claims, 7 Drawing Sheets

SHAPED CONNECTING PIECE FOR CONNECTING STRUCTURAL PROFILE MEMBERS

BACKGROUND OF THE INVENTION

The invention relates to a shaped connecting member or piece for connecting structural profile members, in particular door or window casement sections, on which includes at least one attachment leg that can be inserted into an attachment chamber of the profile member and fixed in position therein.

In connection with the manufacture of door and window frames made of aluminum extruded sections it is, for example, known to miter the sections and to connect them together with corner connectors. The corner connectors are either cut extruded sections or are made of zinc diecasting, which have attachment legs that are inserted into cavities of the mitered aluminum sections, and cementer therein or fastened with beads or the use of screws or expansion pins. Expensive machines are necessary for beading, especially to profiles beaded at right angles to the profile direction. The possibilities of screwing or pinning are labor and wage intensive. If, during the insertion of an attachment leg into the cavity, a permanent press fit of the attachment leg in the cavity is to be achieved from the beginning owing to the specified tolerances, a great deal of machining cost also would be necessary.

Corner connectors known from German DE-OS 23 65 332 include attachment legs provided with ribs which extend in the longitudinal direction and which taper off in the direction of the attachment leg. This corner connector is driven into the cavities of the frame pieces that are filled with a plastic adhesive and additionally is fastened with conical grooved pins. Such corner connectors demand not only labor intensive fabrication but also the production of the frames requires a high machine cost.

SUMMARY OF THE INVENTION

Therefore, the object of the invention is to design a shaped connecting member or piece of the aforementioned type in such a manner that its attachment leg can be inserted easily, i.e. for example by hand, into an attachment chamber bordered by metal such as aluminum and still can be reliably fixed in position therein, so that an adequately stable corner connection for, e.g., door frames, window frames or the like can be produced.

This object is achieved in accordance with the invention in that at least one resilient element provided in the region of at least one attachment leg projects over one side surface of the attachment leg in a manner such that, when the attachment leg is inserted into the attachment chamber, at least one outer segment or portion of the resilient element gives way elastically toward the inside and blocks the attachment leg from pulling out of the attachment chamber.

Owing to the invention, the resilient element can bend when the attachment leg is inserted into the attachment chamber of the structural profile and can slide flexibly on the inner wall of the attachment chamber as far as the final position of the attachment leg in the attachment chamber. The fastening of the attachment leg in the final position is achieved in that, when an outward pulling force is applied to the attachment leg, the bent free end of the resilient element catches on the inner surface of the wall of the attachment chamber and in this manner the attachment leg is fixed permanently and reliably in its final position.

Another advantageous feature of the invention is that the resilient element is disposed in the region of a recess in the side surface of the attachment leg. To this end, circumstances permitting, requisite free space is provided so that the free end of the resilient element can compress during insertion of the attachment leg into the attachment chamber. Thus, the attachment leg can be fitted shape-lockingly, but without a great deal of force, into the attachment chamber and can be inserted optionally into attachment chamber by overcoming only small frictional forces. In this manner the attachment leg not only is fixed reliably in the attachment chamber axially, but also it is ensured against rocking sideways since a large area of its outer surface can rest on the inner surface of the walls of the attachment chamber.

In an especially advantageous design of the invention, the resilient element is designed as, for example, a straight spring steel plate, straight spring wire or as a part of a clip or a cuff. Thereby, the realization of the invention is extremely inexpensive, since such components are generally available.

The problem on which the invention is based can be solved in an especially simple and reliable manner in that the free end of the resilient element protrudes beyond the side surface of the attachment leg, away from the free end thereof, vertically or diagonally to the longitudinal axis thereof. In this manner, the attachment leg easily can be slid into the attachment chamber while the free end of the resilient element gives way flexibly, but simultaneously the desired barb-like function of the resilient element is fulled reliably. It has been demonstrated that the oblique angle of the resilient element relative to the longitudinal axis of the attachment leg in a direction away from the end of the attachment leg ranges expediently from 70° to 20°, preferably 60°.

The resilient element designed, e.g., as a spring steel plate or spring wire can be mounted to the respective attachment leg by inserting it into a slot of the attachment leg and fixing it in position therein.

A clip optionally forming the resilient element can be latched, for example, into a recess in the side surface of the attachment leg. Thus, the recess fulfills a double function, i.e. to be a receptacle for the clip and free space for the resilient element. The clip can be made of a resilient flat material, e.g. spring steel, in order to guarantee permanently a flawless function.

Expediently, the clip has a central portion that extends substantially in the longitudinal direction of the attachment leg and that is relatively rigid, thus being self-bearing but also supported by the surface areas of the attachment leg. The clip has profiled latching segments which are bent from transverse ends and which can give way flexibly when the clip is inserted into the recess and which can interact force and/or shape-lockingly with preferably suitably profiled counter latching surfaces of the recess. Thus, the clip fits tightly in the recess, without impairing the function of the resilient element which also is bent centrally from one transverse end and can spring into the recess.

In another design of the invention, the clip has two end segments which are bent in opposite directions from a central portion extending with an essential component thereof in the longitudinal direction of the attachment leg. At least one end segment forms the resilient element, and at least the other end segment is received as a holding member in a slot of the attachment leg. In this manner, a simple and reliable assembly is possible even with unskilled labor. The clip is advantageously symmetrical and each end segment forms a resilient element. Depending on the orientation at which the clip is inserted into the recess, only one end segment functions as a resilient element and the other end segment functions as the holding member. In this manner, the assembly of the clip is simplified even more.

To guarantee a secure fit of the clip even when the attachment leg is slid into its attachment chamber, i.e. to guarantee a reliable abutment when the outer end of the elastic element springs inwardly, another advantageous feature of the invention provides that the central portion is braced at least region by region against a bottom of the recess. For a symmetrical design of the clip, it is advantageous if the central portion is braced in at least two separate regions against segments of the bottom of the recess that lie at various altitudes. These two regions of the central portion that rest on the bottom of the recess can be separated by an intermediate portion that is arranged diagonally to the longitudinal direction of the attachment leg and that is resilient to thereby contribute to the clamped holding of the clip in the recess.

The slot which is intended to receive the holding member of the clip can be, for example, part of the recess and can be connected to a main region of the recess only by a slight depression which is defined by the upper region of the bottom of the recess. The depth of such depression corresponds precisely to the thickness of the flat material from which the clip is made. In this manner, the portion of the slip fitting into this depression and resting on the upper segment of the bottom of the recess is held while the attachment leg is slid into its attachment chamber. Thereby, the clip as a whole is held reliably in the recess despite the springiness of the resilient element, since the outer end of the region of the clip forming the resilient element slides along the inner surface of the wall of the attachment chamber. The one bent end segment of the slip preferably is fixed in the slot, and the one portion of the central part of the clip is fixed shape-lockingly in position between the bottom of the recess and the inner surface of the attachment chamber.

To further improve the hold of the clip, the slot can be expanded from the side thereof for insertion of the one end segment of the clip to form an undercut. The end segment is bent from the principle plane of the clip at more than 90°, preferably approximately 120°. Thus, the clip is held with some play by the undercut.

To further improve the fit of the shaped connecting piece and its arresting effects, the resilient element exerts its spring force preferably vertically to the plane of the frame formed by the structural profile members. Thus, an optional recess on the corresponding side of the attachment leg also is provided.

The invention especially is suitable for the manufacture of corner connections of profiled frames for doors or windows. In such case, the attachment legs extend at an angle, preferably at right angle to each other. However, the shaped connecting piece of the invention also can be elongated in order to connect together, for example, profiled elements of predetermined length.

To achieve a tight fit of an attachment leg of a connecting element in a respective attachment chamber, the cross sectional outer contour of the attachment leg corresponds over a significant portion of its length substantially to the cross sectional inner contour of the attachment chamber. Thus, in this case large areas of the attachment legs and the attachment chambers can fit substantially shape-lockingly and with slight friction fit inside each other. The insertion of the attachment leg into the respective attachment chamber further can be facilitated by providing the free end of the attachment leg with a peripheral chamfer. As is known, the attachment legs of the shaped connecting piece of the invention preferably are polygonal, in particular rectangular or square in cross section as are the related attachment chambers, so that the shaped connecting piece automatically is ensured against twisting relative to the structural profile member.

If the resilient element is designed as a part of a cuff, such cuff is received preferably in a recess designed as a circumferential groove of the attachment leg. In so doing, the cuff can be designed, for example, as a clasp which is clamped on the attachment leg in the region of the recess. In this manner a simple assembly is possible. The cuff also can be made of a resilient flat piece of material, e.g. spring steel. The resilient element is bent outwardly preferably to guarantee a simple fabrication from the flat piece of material. The positioning of the cuff on the attachment leg is guaranteed if the depth of the circumferential groove is identical or greater than the material thickness of the cuff. The depth of the circumferential groove can be virtually identical to the material thickness of the sleeve if, as the attachment leg is inserted into the attachment chamber of the structural profile member, the resilient element is forced into a recess of the cuff from which it was previously bent. In this design the attachment leg can be slid with a minimum play into the attachment chamber, thus guaranteeing the rearward arresting edge of the resilient element projects beyond the circumference of the attachment leg in order to block the attachment leg from pulling out of the attachment chamber.

Whereas as a rule during the realization of the invention a single resilient element suffices for each attachment leg, two or more resilient elements according to the invention can be provided on the same attachment leg, for example, on opposite side surfaces thereof or, for example, also offset axially, in order to further increase the reliability of connection between the structural profile members.

In another advantageous embodiment of the invention, the shaped connecting piece is designed as a corner angle and has at the inner transition of its two attachment legs a groove or similar recess. Such groove or recess allows an attachment leg to be slid overly far into its respective attachment chamber of a structural profile member before the other attachment leg is completely inserted into its respective attachment chamber of the other structural profile member. In this manner, an especially tight fit of the corner angle can be obtained. If, after the first attachment leg has been inserted overly far without tension but tightly into its respective chamber, and then the second attachment leg of the corner angle is compressed into its attachment chamber, the result of the 45° mitered cut of the related ends of the structural profile members, for example window casement sections to be connected, is a slight pulling out of the first inserted attachment leg and thus a clamping of the two structural profile members by means of the resilient elements. The force-locking interconnection is achieved, for example, by means of a shape change of the relatively soft, e.g. aluminum, chamber wall with respect to the resilient element made of hardened steel.

DETAILED DESCRIPTION OF THE INVENTION

Figure 1:
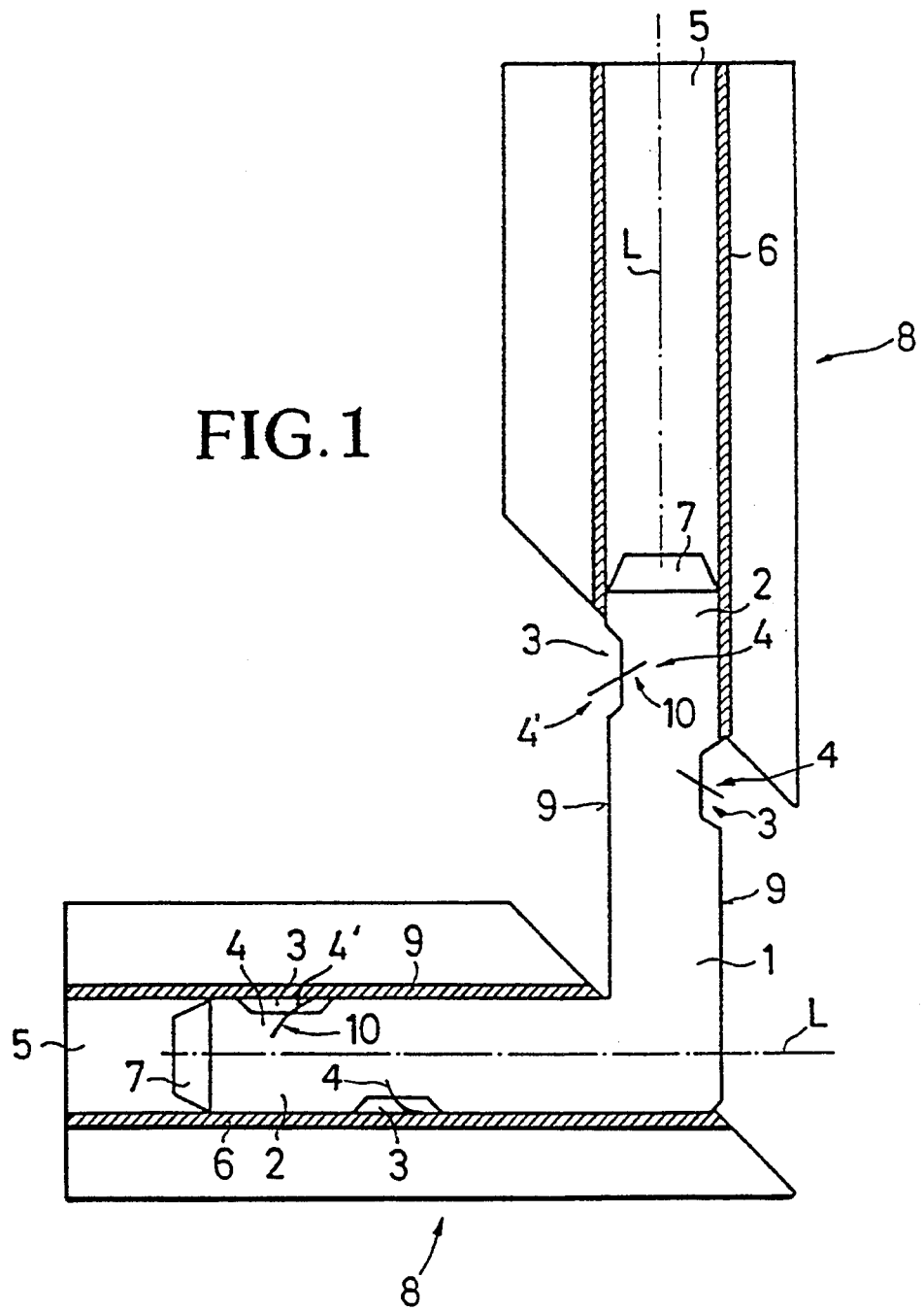
FIG. 1 is a sectional view of a corner angle connection or shaped connecting piece for connecting plastic sheathed aluminum sections of an aluminum window, where one attachment leg of the shaped connecting piece is slid only partially into a related attachment chamber and another leg is slid into its final position.

A shaped connecting member or piece 1 shown in FIG. 1 includes two attachment legs 2 extending at right angles. In the vicinity of the end of each of the two attachment legs 2, but slightly axially offset therefrom, and on opposite side surfaces 9 thereof, are formed two flat recesses 3. However, only one or more than two recesses 3 can be formed in one or different side surfaces 9 of the attachment legs 2 of the shaped connecting piece 1. In at least one of the recesses 3 of each attachment leg 2 is arranged at least one resilient element 4 designed as a spring steel plate. The inner ends of the spring steel plates 4, which are flat in this case, are inserted and fixed in position in slots 10 of the attachment legs 2. Each spring steel plate 4 extends at an acute angle to the longitudinal axis L of the respective attachment leg 2 such that a free end 4' faces away from the end of the respective attachment leg 2. A specific length portion of the free end 4' of the respective spring steel plate 4 projects outwardly from the respective recess 3 beyond the side surface 9.

When the attachment leg 2 is inserted into an attachment chamber 5 of a structural profile member 8 that is bordered by an extruded aluminum section 6, the thickness of the spring steel plates 4 makes it possible to bend over the free end 4' of the respective spring steel plate 4 toward the inside, i.e. in the direction of the longitudinal axis L of the attachment leg 2. This enables a cushioned sliding of the free end 4' on the metal inner surface of the attachment chamber 5 as far as the final position of the attachment leg 2 in the attachment chamber 5, and also resists pulling out of leg 2 by tending to catch the free end 4' on the inner surface of the wall of the attachment chamber 5 while exerting a pulling force on the attachment leg 2. The ends of the attachment legs 2 are provided with peripheral chamfers 7, which facilitate the insertion of the attachment legs 2 into the openings of the attachment chambers 5. Instead of the spring steel plate 4, one or more spring wires also can be used.

In accordance with various constructions, the shaped connecting pieces 1 can be designed in different angular shapes and also as straight or rectilinear shapes. The thickness and outer contour of the attachment legs 2 of the shaped connecting piece 1 correspond to the cross sections of the respective attachment chambers 5 of the profiled extrusions 6 to be connected.

Figure 2A:
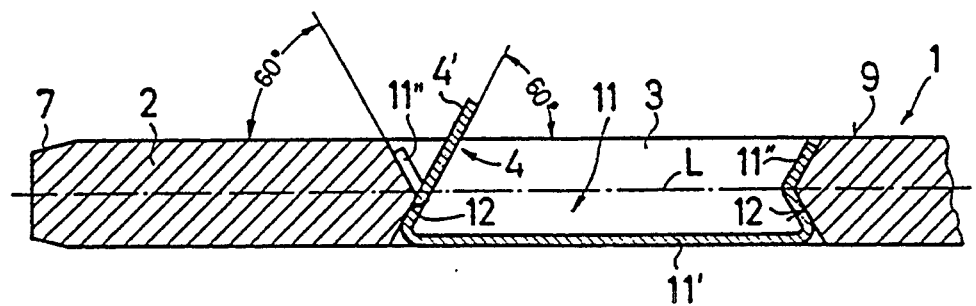
FIGS. 2a and 2b respectively are a longitudinal sectional view and a top view of an end of an attachment leg according to another embodiment of the invention.
Figure 2B:
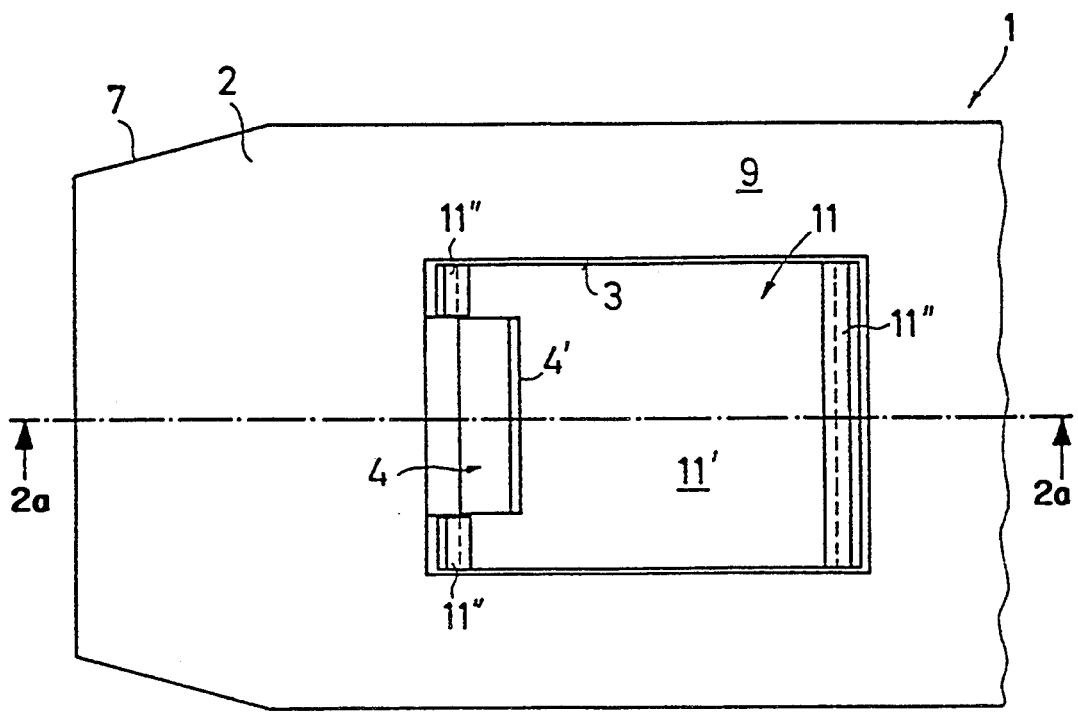

FIGS. 2a and 2b respectively are a longitudinal sectional view and a top view of an end portion or segment of an attachment leg 2 of a shaped connecting piece 1 according to another embodiment of the invention. A flat side of the end portion or segment has therein an opening or recess 3 in which can be locked a clip 11. The clip 11 has a central segment 11' which extends substantially in the longitudinal direction of the attachment leg 2, and end latching segments 11'', each of which is bent back axially and then bent forward axially. Segments 11'' interengage shape and force-lockingly with suitably bent counter latching surfaces 12 which define opposite ends of the recess 3 when the clip 11 is snapped into the recess 3. A resilient element 4 is also bent away from one transverse end of the central segment 11' and is bordered on opposite sides thereof by partial latching segments 11'''. Segment 4 exerts its spring force vertically to the plane of a corresponding profiled element frame, which is formed with the aid of the shaped connecting pieces 1 designed as corner angles according to the invention. Prior to the insertion of the attachment leg 2 into a respective attachment chamber 5, a free end 4' of the resilient element 4, which in this case is also a part of a clip 11 made of a flat material, e.g. spring steel, also projects at an angle of approximately 60° beyond the upper side surface 9 of the attachment leg 2 in such a manner that the free end 4' faces away from the free end of the attachment leg 2 that is provided with a chamfer 7. When inserting the attachment leg 2 into the attachment chamber 5, the free end 4' of the resilient element 4 can give way flexibly in the direction of the inside of the recess 3. In the installed state of the attachment leg 2, virtually the entire free end 4' dips into the recess 3, and front edge thereof catches on a metallic inner wall surface of the attachment chamber 5. Thus, the attachment leg 2 fits tightly in the attachment chamber 5 and no longer easily can be pulled therefrom. By providing the recess 3 and the latching of the clip 11, the invention is especially simple to realize.

Figure 3A:
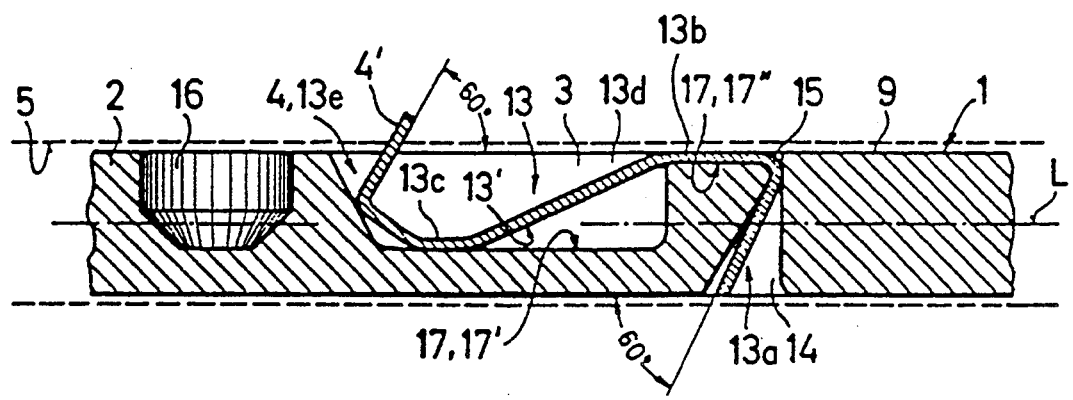
FIGS. 3a and 3b respectively are a longitudinal sectional view and a top view of a segment of an attachment leg according to another embodiment of the invention.
Figure 3B:
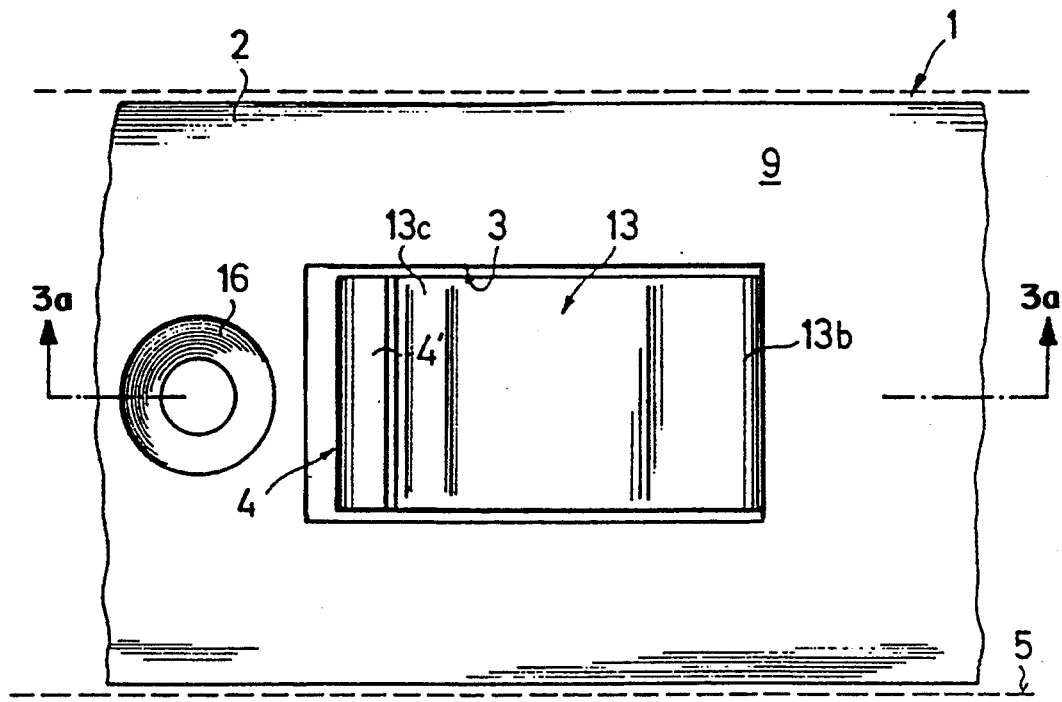

FIGS. 3a and 3b show a different embodiment. Here, too, a flat side or a segment or portion of an attachment leg 2 of a shaped connecting piece of the invention has a recess 3 into which a clip 13 can be inserted. The recess 3 has a bottom 17 and includes a main section bounded by a bottom portion 17' of the bottom 17 and a shallow flat recess 15 adjoining the main section and bounded by an upper portion 17'' of bottom 17. In this case, one end segment 13a of the slip 13 is bent and extends into a slot 14 which expands in the shape of a V from the recess 15 in upper side surface 9. The thickness of a portion 13b of the clip 13 corresponds to the depth of the flat recess 15. The end segment 13a held in the slot 14 is bent from the plane of the slip 13 (made of a flat material) by about 120° relative to the longitudinal axis L of the attachment leg 2, so that end segment 13a reaches behind an undercut formed by the slot 14. Portion 13b and another portion 13c of the slip 13 extend parallel to the longitudinal axis L of the attachment leg 2 and are connected together by an inclined intermediate portion 13d. Clip portions 13b and 13c are braced on the portions 17" and 17' respectively of the recess 3. An opposite end segment 13e is bent in a direction reverse to that of end segment 13a and in the illustrated position of the clip 13 forms a free end 4' projecting out of the recess 3 beyond the surface 9. The resilient element 4 of this embodiment of the invention is bent from the portion 13c of the clip, and end segment 13e is further bent to form an apex resting on an inclined front surface of the recess 3 that expands the recess 3 outwardly. In this manner, functionality with respect to the behavior of the resilient element is further improved. The clip 13 thus is shaped somewhat like an S in side view. The outer portion of the resilient element 4 is inclined at an angle of about 60° relative to the longitudinal axis L, whereby its free end 4' faces away from the free end of the attachment leg 2. Thus, during insertion of the attachment leg 2 into an attachment chamber 5, the free end 4' of the resilient element 4 can give way flexibly in the direction of the interior of the recess 3. In so doing, the entire free end 4' dips into the main section of the recess 3, and its relatively sharp front edge catches, as in the case of all of the other embodiments, on the inner surface of the wall of the attachment chamber 5 when any force acts on the attachment leg to pull it outwardly. Flat portion 13c of the slip 13 is counter supported on the bottom portion 17' of the recess 3, and flat portion 13b is counter supported on the bottom portion 17" of the recess 15'. The portion 13b is fixed in position by the inner surface of the wall of the attachment chamber 5. For additional ensurance against pulling out, a screw may extend into a blind borehole 16 that can be formed in the attachment leg 2.

Figure 4:
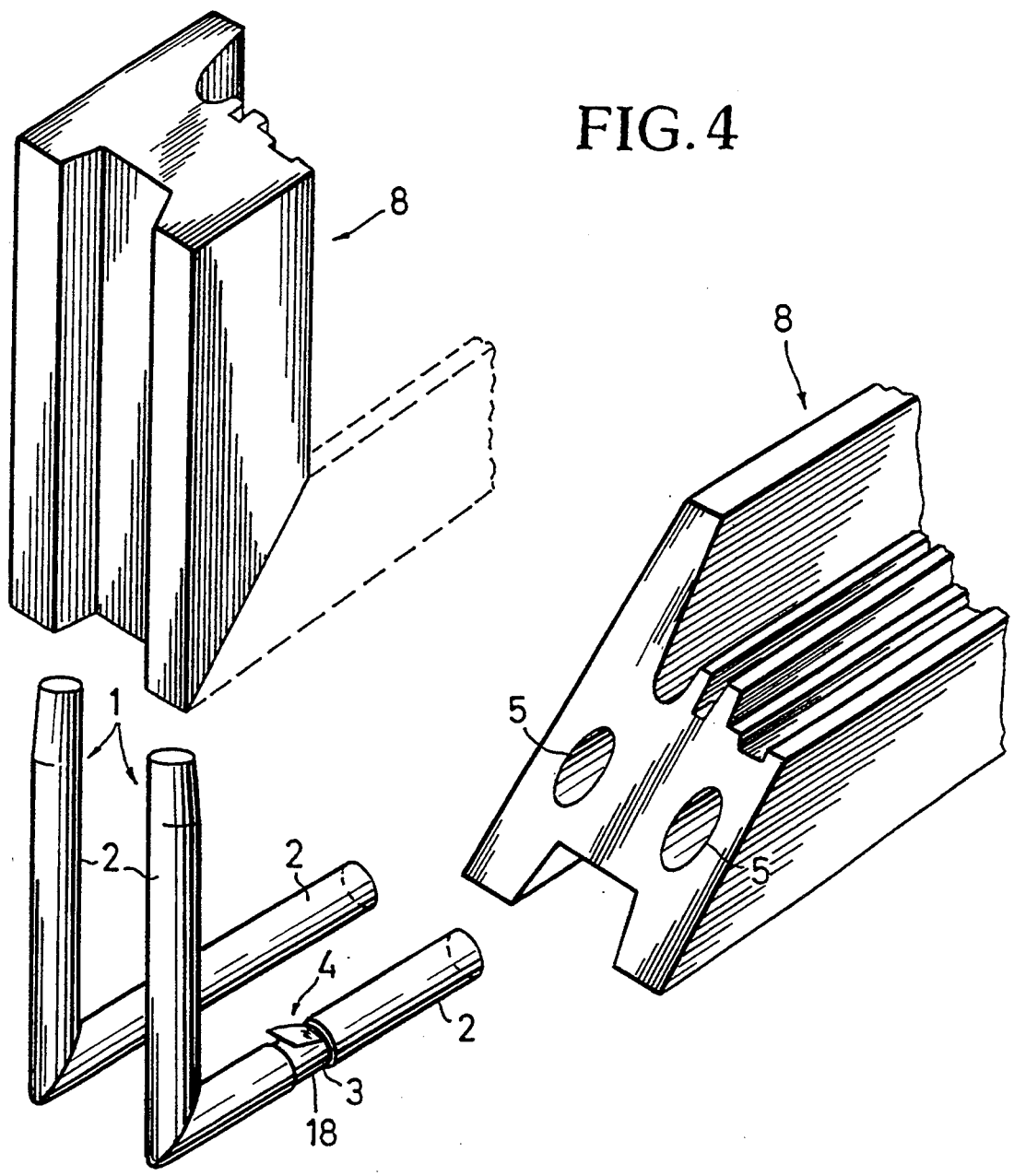
FIG. 4 is an exploded perspective view of another embodiment of a corner angle connection illustrating the invention.
Figure 5:
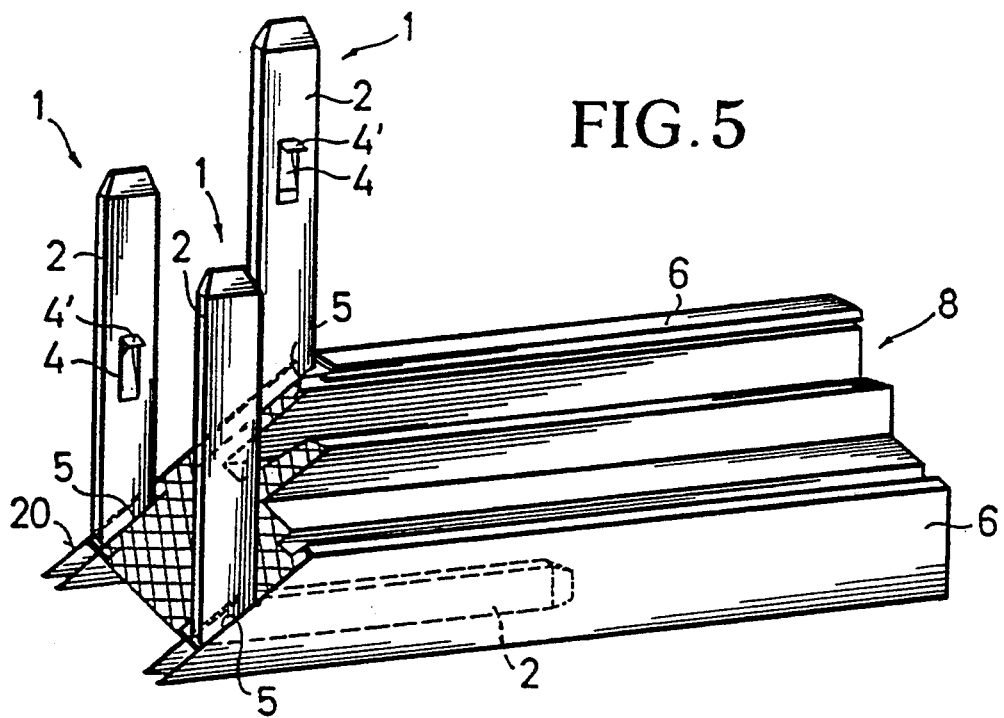
FIG. 5 is a perspective view of an end segment of an extruded structural profile member cut on a miter to 45° and at which three shaped connecting pieces designed as corner angles are inserted with one leg each into respective chambers of the profile member.

In the embodiment shown in FIG. 4, a corner angle connection between two mitered, non-profile extruded, structural profile members 8 which are made of plastic, e.g. polyurethane, is provided in such a manner that each of two shaped torsion pieces 1, designed as corner angle members, are inserted into two corresponding attachment chambers 5. The shaped connecting pieces 1 are made of a round extruded material, for example, steel. A resilient element 4 is bent outwardly as a bent out piece of a cuff 18 formed from a flat piece of material, for example flat steel. The cuff 18 is clamped immovably axially on an attachment leg 2 as a clasp in the region of a recess 3 in the form of a circumferential groove in leg 2. The width of the cuff corresponds substantially to the inside circumference of the recess 3. The depth of the recess 3 is such that, taking the material thickness of the cuff 18 and the resilient element 4 into consideration, the attachment leg 2 can be easily slid into the attachment chamber 5, but cannot be pulled therefrom, since the rearward edge of the resilient element 4 catches in the plastic material of member 8 upon application of a pulling force.

Another embodiment of a shaped connecting piece 1, which can be used for a force-locking connection of structural profile member 8 mitered to 45°, for example of a window or door frame, will be explained in detail with reference to FIGS. 5 to 9. An end of the structural profile member 8 shown in FIG. 8 has a mitered cut surface 20° of 45°. The structural profile member 8 is made of two profiled extrusions 6 which are connected together by means of a polyurethane core. One or two chambers 5 are formed in each of the profiled extrusions 6. The shaped connecting pieces 1 designed as corner angles have on the inside of each leg a resilient element 4 which is made of hardened spring steel, preferably as a clip.

Figure 6:
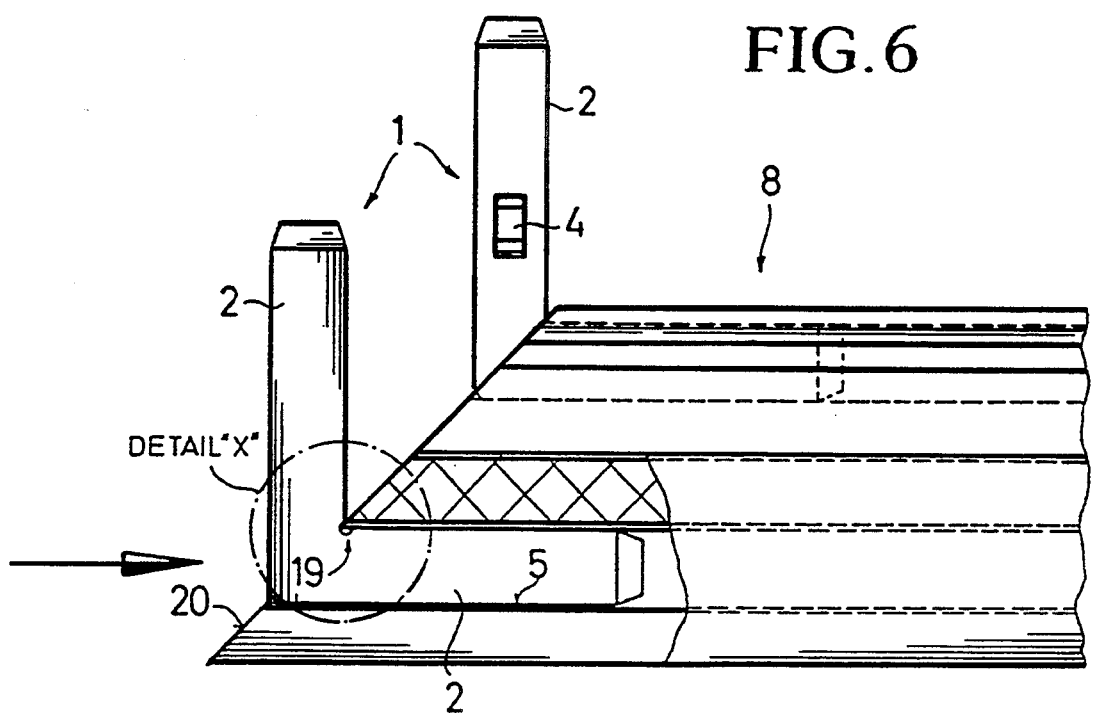
FIG. 6 is a side view of the arrangement of FIG. 5, partially broken away.
Figure 7A:
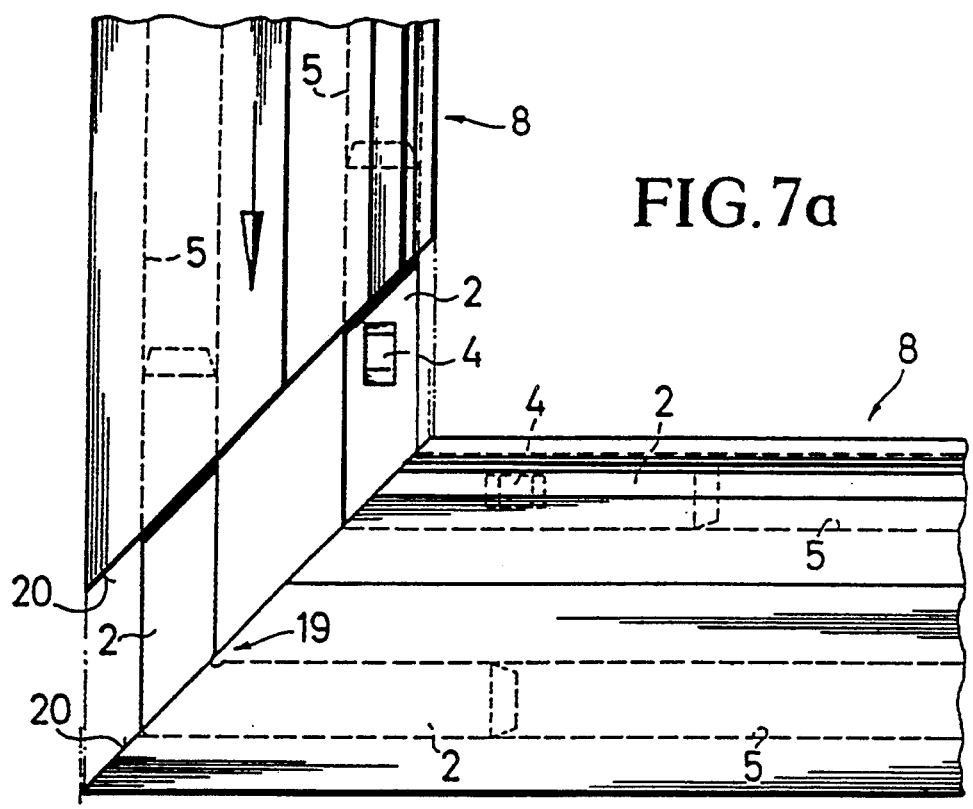
FIG. 7a is a side view of an end segment of one structural profile member, after another structure profile member has been partially slid onto free legs of shaped connecting pieces designed as corner angles.
Figure 7B:
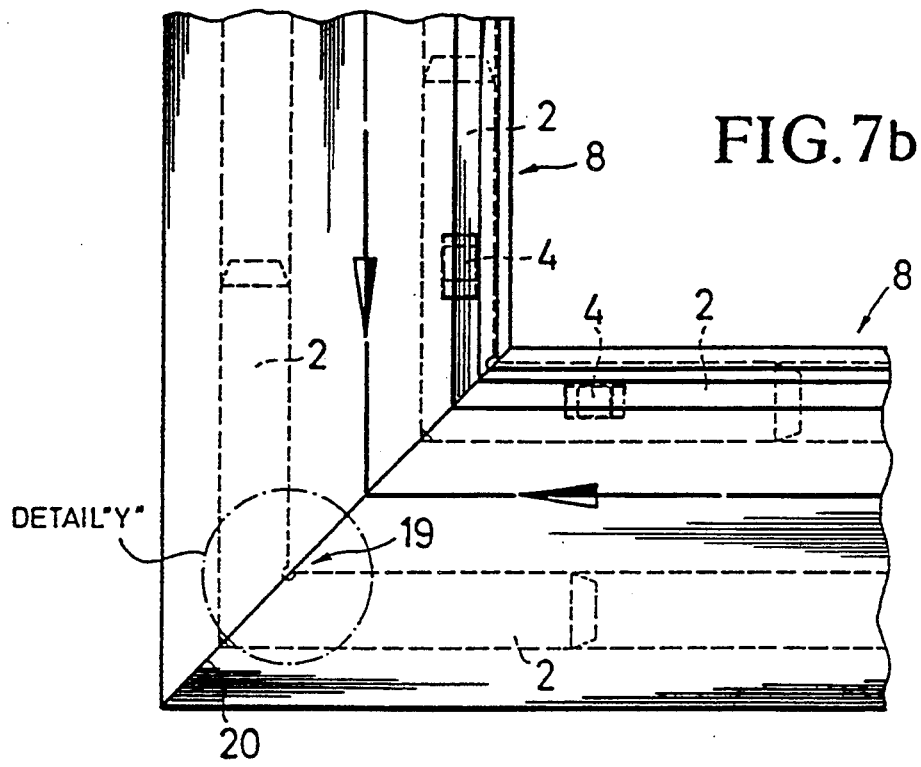
FIG. 7b is a view similar to FIG. 7a, but after the other structural profile member also has been slid completely onto the corresponding attachment leg of the shaped connecting pieces and the first legs have been moved out slightly so that mitered cuts of 45° are exactly coincident.
Figure 8:
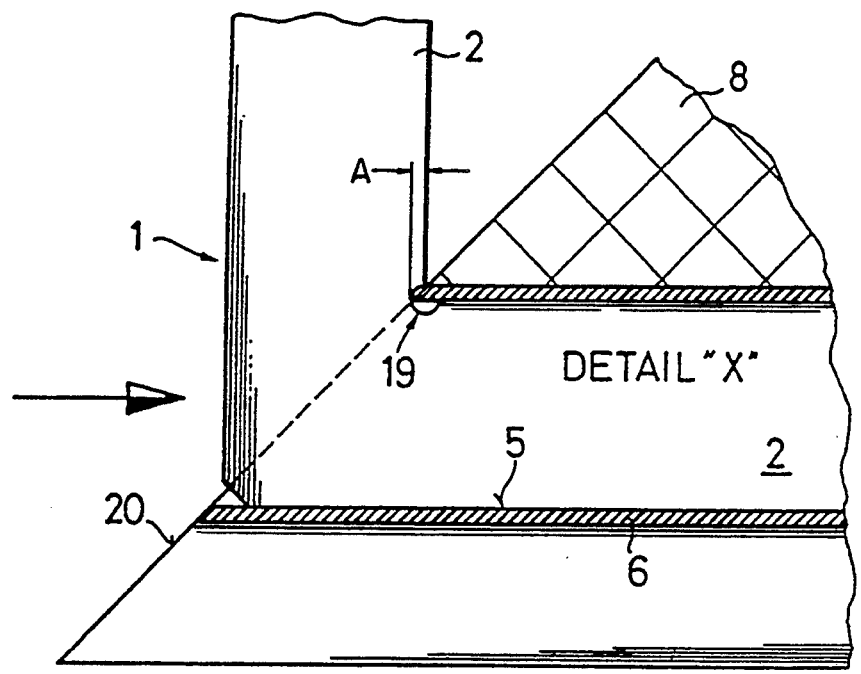
FIG. 8 is an enlarged view of detail X from FIG. 6.
Figure 9:
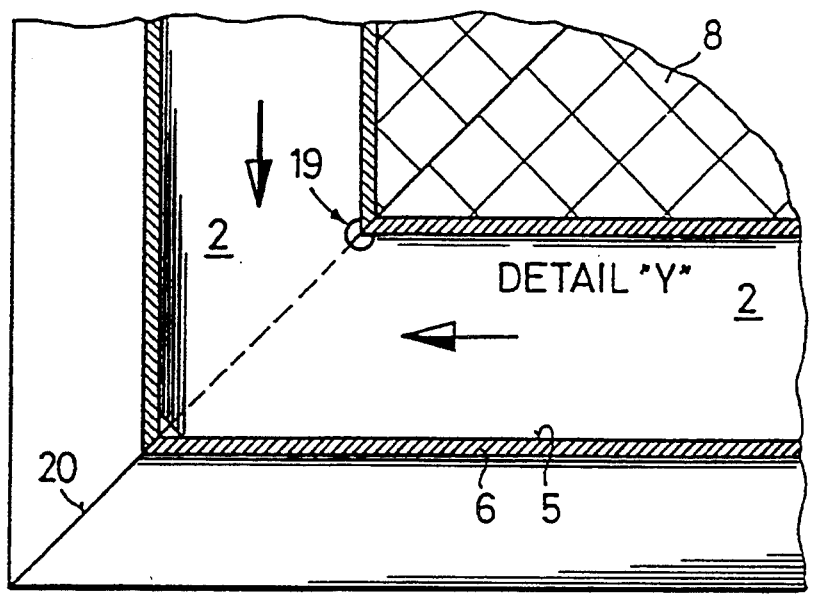
FIG. 9 is an enlarged view of detail Y from FIG. 7b.

FIG. 6 shows one attachment leg 2 of each corner angle already inserted into a respective attachment chamber 5 as far as a stop, i.e. each corner angle fits shape-lockingly, but without tension, securely in its respective attachment chamber 5. Since each corner angle has at the inside of the transition of its attachment legs 2 a recess 19 designed as a groove, the respective attachment legs 2 are inserted slightly too far into their respective attachment chambers 5, e.g. by an amount A, a feature that is especially clear from FIG. 8. If at this stage, as clearly recognizable from FIGS. 7a and 7b, the respective other attachment legs 2 of the corner angles are inserted into their assigned attachment chambers 5 of the other structure profile member 8 and subsequently totally pressed in, the result of the 45° mitered cut surfaces 20 is that the first inserted attachment leg 2 is slightly pushed out. Thus, both structural profile members 8, forming e.g. frame sections, are under tension due to the resilient elements 4. FIG. 9 best shows the final state of compression of surfaces 20. In this manner, a force-locking interconnection is produced, since the free ends 4' of the resilient elements 4, made for example of hardened spring steel, can work into the softer chamber walls, made e.g. of aluminum, through shape change.

I claim:

1. A shaped connecting member for connecting structural profile members such as door or window casement sections, said connecting member comprising:
   at least one elongated attachment leg to be inserted into an attachment chamber of a respective profile member and fixed in position therein;
   said attachment leg having opposite side surfaces each having therein a separate recess;
   resilient elements on respective of said opposite side surfaces in regions of respective said recesses; and
   each said resilient element including a free end segment extending outwardly beyond the respective said side surface of said attachment leg, such that as said attachment leg is inserted into the attachment chamber said end segment elastically deforms toward said recess and thereafter acts against a surface of the profile member defining the attachment chamber to prevent removal of said attachment leg therefrom, and each said resilient element being part of a clip that fits into the respective said recess, said clip including a central portion and axially opposite end portions bent from said central portion in opposite directions.

2. A connecting member as claimed in claim 1, wherein said recesses are offset axially of said attachment leg.

3. A connecting member as claimed in claim 2, wherein said recesses are located adjacent a free end of said attachment leg.

4. A connecting member as claimed in claim 1, wherein said free end segment of said resilient element extends away from said attachment leg substantially perpendicularly thereto.

5. A connecting member as claimed in claim 1, wherein said free end segment of said resilient element extends from said attachment leg in a direction inclined away from a free end thereof.

6. A connecting member as claimed in claim 5, wherein said direction is inclined at an angle of from 20° to 70° relative to an axial dimension of said attachment leg.

7. A connecting member as claimed in claim 6, wherein said angle is approximately 60°.

8. A connecting member as claimed in claim 1, wherein said connecting member includes two said attachment legs extending at an angle to each other.

9. A connecting member as claimed in claim 8, wherein said angle comprises a right angle.

10. A connecting member as claimed in claim 8, further comprising a recess formed in an inner transition of said two attachment legs.

11. A connecting member as claimed in claim 1, wherein said attachment leg has over a substantial portion of the length thereof an outer cross-sectional contour complementary to an inner cross-sectional contour of the surface of the profile member defining the attachment chamber.

12. A connecting member as claimed in claim 1, wherein said attachment leg has at a free outer end thereof a peripheral chamfer.

13. A connecting member as claimed in claim 1, wherein said clip is formed from a flat piece of resilient material.

14. A connecting member as claimed in claim 15, wherein said material is spring steel.

15. A connecting member as claimed in claim 1, wherein said resilient element comprises a first said end portion, and a second said end portion forms a holding segment extending into a slot formed in said attachment leg.

16. A connecting member as claimed in claim 15, wherein said clip has substantially a symmetrical configuration, such that said clip may be oriented in said recess with either of said end portions forming said resilient element and the other of said end portions forming said holding segment.

17. A connecting member as claimed in claim 15, wherein said central portion is braced against a bottom of said recess.

18. A connecting member as claimed in claim 17, wherein said bottom includes two surfaces at different positions widthwise of said attachment leg, and said central portion includes two flat portions abutting respective said surfaces.

19. A connecting member as claimed in claim 18, wherein said central portion includes an intermediate segment extending between said two flat portions in a direction inclined relative thereto.

20. A connecting member as claimed in claim 18, wherein said slot extends from one of said surfaces of said bottom of said recess.

21. A connecting member as claimed in claim 20, wherein said slot expands in a direction away from said one surface of said bottom of said recess.

22. A connecting member as claimed in claim 20, wherein said flat portion abutting said one surface of said bottom of said recess is to be clamped thereagainst by the surface of the profile member defining the attachment chamber when said attachment leg is inserted therein.

23. A connecting member as claimed in claim 22, wherein said resilient element exerts a spring force in a direction to be perpendicular to the surface of the profile member defining the attachment chamber when said attachment leg is inserted therein.

24. A shaped connecting member for connecting structural profile members such as door or window casement sections, said connecting member comprising:
at least one elongated attachment leg to be inserted into an attachment chamber of a respective profile member and fixed in position therein;
said attachment leg having opposite side surfaces each having therein a separate opening;
resilient elements on respective of said opposite side surfaces in regions of respective said openings; and
each said resilient element including a free end segment extending outwardly beyond the respective said side surface of said attachment leg, such that as said attachment leg is inserted into the attachment chamber said end segment elastically deforms toward said opening and thereafter acts against a surface of the profile member defining the attachment chamber to prevent removal of said attachment leg therefrom, and each said resilient element being part of a clip that fits into the respective said opening, said clip including a central portion extending axially of said attachment leg and axially opposite end portions bent from said central portion, each said end portion having a bent shape lockingly engaging respective latching surfaces of said opening, said resilient element comprising an extension of one of said end portions.

25. A connecting member as claimed in claim 24, wherein said openings are offset axially of said attachment leg.

26. A connecting member as claimed in claim 25, wherein said openings are located adjacent a free end of said attachment leg.

27. A connecting member as claimed in claim 24, wherein said free end segment of said resilient element extends away from said attachment leg substantially perpendicularly thereto.

28. A connecting member as claimed in claim 24, wherein said free end segment of said resilient element extends from said attachment leg in a direction inclined away from a free end thereof.

29. A connecting member as claimed in claim 28, wherein said direction is inclined at an angle of from 20° to 70° relative to an axial dimension of said attachment leg.

30. A connecting member as claimed in claim 29, wherein said angle is approximately 60°.

31. A connecting member as claimed in claim 24, wherein said connecting member includes two said attachment legs extending at an angle to each other.

32. A connecting member as claimed in claim 31, wherein said angle comprises a right angle.

33. A connecting member as claimed in claim 31, further comprising a recess formed in an inner transition of said two attachment legs.

34. A connecting member as claimed in claim 24, wherein said attachment leg has over a substantial portion of the length thereof an outer cross-sectional contour complementary to an inner cross-sectional contour of the surface of the profile member defining the attachment chamber.

35. A connecting member as claimed in claim 24, wherein said attachment leg has at a free outer end thereof a peripheral chamfer.

36. A connecting member as claimed in claim 24, wherein said clip is formed from a flat piece of resilient material.

37. A connecting member as claimed in claim 36, wherein said material is spring steel.

* * * * *